Nov. 30, 1954  H. H. BLAIR  2,695,965
APPARATUS FOR PRODUCTION OF X-RAY IMAGES
Filed Aug. 14, 1950  2 Sheets-Sheet 1
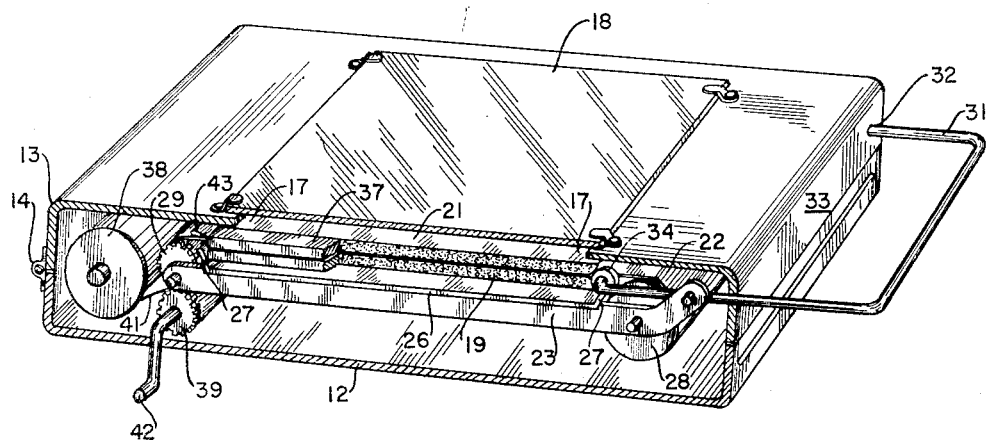
FIG.—1
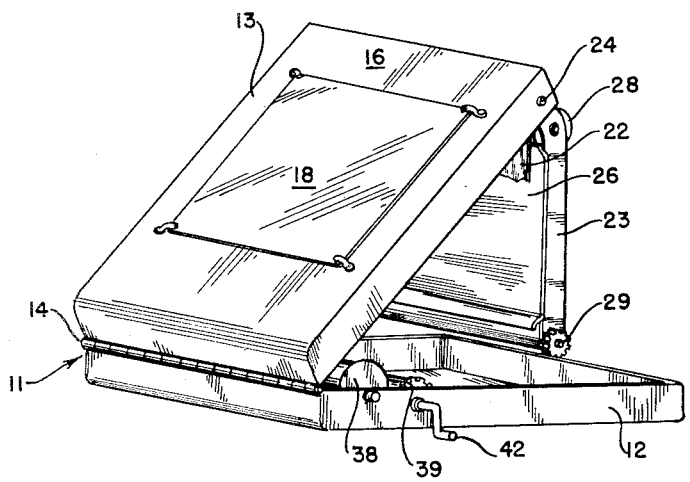
FIG.—2
*INVENTOR.*
Hugh H. Blair
BY
ATTORNEY Nov. 30, 1954    H. H. BLAIR    2,695,965
APPARATUS FOR PRODUCTION OF X-RAY IMAGES
Filed Aug. 14, 1950    2 Sheets-Sheet 2
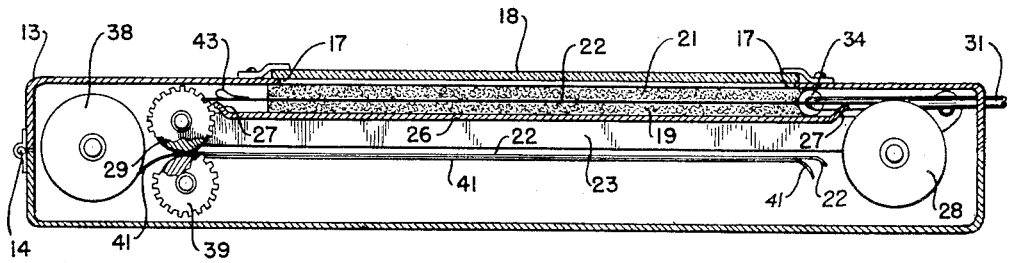
FIG.—3
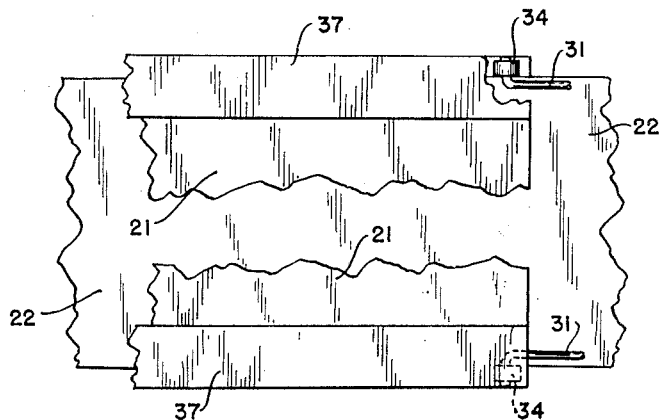
FIG.—5
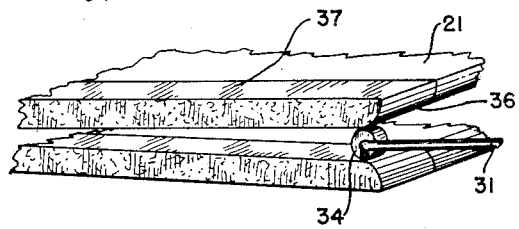
FIG.—4
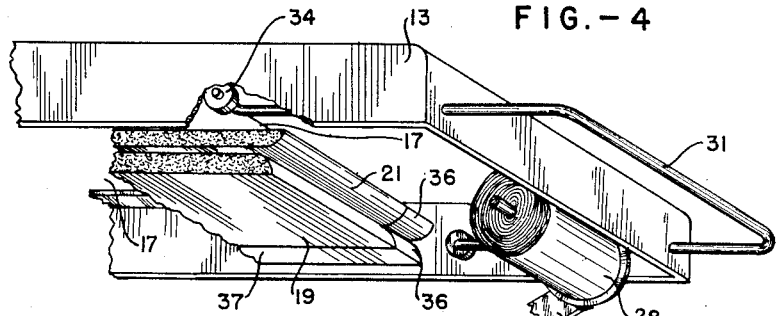
FIG.—6
INVENTOR.
Hugh H. Blair
BY
ATTORNEY

United States Patent Office 2,695,965
Patented Nov. 30, 1954

2,695,965

APPARATUS FOR PRODUCTION OF X-RAY IMAGES

Hugh H. Blair, Denver, Colo.

Application August 14, 1950, Serial No. 179,213

6 Claims. (Cl. 250—66)

This invention relates to a method and means for taking, developing and printing radiographs.

Previously radiographs have been taken in a cassette and then developed and printed in accordance with standard practices which require the expenditure of a considerable amount of time for developing a film that has been exposed to X-rays. The present inventor intends to provide a mechanism and apparatus for the production of radiographs that will materially reduce the time interval between exposure and observation of the finished print. It is believed that use of such a mechanism to reduce the aforementioned time interval will materially improve X-ray techniques to the end that X-ray will be an even more important tool of the medical sciences.

In developing an invention for the foregoing purposes the present inventor has been guided by the following objectives;

To provide a unit for X-ray purposes which incorporates direct developing and printing features within a cassette, so that a print of subject matter exposed to X-rays in the cassette may be obtained in a relatively short time.

To provide a compact container or cassette inclusive of sensitized screens, a film to be exposed to X-rays and mechanism for develoing and printing the impression on said film after exposure to X-rays.

To provide a film cassette for X-ray purposes adapted to utilize the direct printing film process recently developed.

To provide an enclosure or container of light weight composed primarily of two compartments, the first compartment of which receives a film for exposure to X-rays and the second compartment of which is shielded from the said first compartment to protect the film received therein from further exposure from all actinic rays.

To provide an opaque shielding plate for covering and enclosing X-ray sensitizing screens and a film passing therethrough in conjunction with direct developing and printing apparatus shielded from said sensitizing screens and positioned to receive the film passing through said sensitizing screens so that a direct print of an X-ray exposure may be made.

Further objects and advantages of the present invention will be apparent from the appended description and drawings in which:

Fig. 1 represents a perspective view in partial section showing the general arrangements of the structural elements of this invention.

Fig. 2 is a perspective view showing apparatus in accordance with this invention in opened position.

Fig. 3 is a cross sectional elevation further showing the arrangement of elements.

Fig. 4 is a perspective view diagrammatically showing the fluorescent crystal sensitizing screens and a mechanism for separating such screens so that film may be introduced therebetween.

Fig. 5 is a plan view further showing the features of the separating mechanism of Fig. 4; and Fig. 6 is a perspective view showing the positioning of the separating mechanism with respect to other structural elements of this invention.

Briefly stated the present invention cooperatively arranges the operative elements of conventional types of X-ray cassettes with direct developing and printing apparatus so that film may be introduced for passage between sensitizing screens in a first shielded compartment before passing out of the compartment into a direct printing and developing compartment where the film and printing paper are passed between pressure rollers to spread a photographic reagent that permeates and develops the film thereby producing a negative having an image thereon while at the same time producing a positive print on the printing paper to the end that the negative and finished print may be received from the apparatus of this invention a very short time after initial X-ray exposure of the film.

It is believed that the apparatus of this invention will be especially beneficial to the medical sciences inasmuch as the direct printing features of the invention will enable a surgeon to locate foreign materials in a person's body immediately before and periodically during an operation. Accordingly the operation may be completed in a shorter length of time with greater accuracy thereby minimizing shock and traumatic conditions.

Referring to the drawings the detailed features of this invention will be more fully shown in Figs. 1, 2 and 3 where it will be noted that the inventor provides a cassette 11 made up of a rectangular shaped base portion 12 and a cooperatively formed lid 13 pivotally mounted on the base 12 by means of a hinge 14. When in the closed position the base portion 12 and lid 13 form a closed sealed container as necessary to prevent the passage of light into the interior of the cassette 11. The upper surface 16 of the lid 13 is provided with an opening 17 as shown in Figs. 1 and 3. This opening 17 is closed off by means of a sheet 18 of light opaque material. Though Bakelite is a preferred material, any plastic or other substance which is opaque to ordinary light rays while being transparent to X-rays will be satisfactory. Mounted within the lid 13 in a position of registration with respect to the opening 17 are a pair of inner and outer sensitizing screens 19 and 21 respectively. These sensitizing screens 19—21 may be made up of any of the fluorescent crystal materials now being used in the X-ray industry for increasing the effects on film of X-ray exposure. The function of these screens is to give off fluorescent light when exposed to X-rays so that the generated fluorescent light will activate the sensitized film 22 passing between the screens 19—21.

A partition member 23 is provided for dividing the interior of cassette 11 into separate compartments. Structurally in the present embodiment the partition 23 is pivotally mounted by means of pivot pins 24 on the lid 13 so that when the lid is opened as shown in Fig. 2 the partition 23 may be moved to the position shown. When closed the partition assumes the position shown in Figs. 1 and 3 so that a lead plate 26 on the face of the partition 23 will be positioned directly behind the sensitizing screens 19—21. Further the ends 27 of the plate 26 are turned upwardly into positions of near contact with film supply roller 28 and compression roller 29 to effectively screen off the upper or exposure portion of the cassette from the lower developing and printing portion of the cassette. Since a lead plate 2 is provided neither the X-rays nor the fluorescent light from the sensitizing screens 19—21 will pass into the developing compartment of the cassette.

When film is being threaded through the sensitizing screens or when after an exposure has been made, it is desired to advance the film, a screen separating mechanism is used to part the sensitizing screens. The mechanism utilized for parting the screens is shown in Figs. 3 through 6. In these figures it will be noted that handle 31 which protrudes through openings 32 in the end wall 33 of the lid 13 has rollers 34 on its forward ends. These rollers 34 are adapted to engage a camming surface 36 of guide rails 37 positioned on the lateral sides of the sensitizing screens 19—21. As the handle 31 is pushed inwardly into contact with these camming surfaces 36, the guide rails 37 and the sensitizing screens 19—21 attached thereto will be parted so that the film 22 may be readily passed from the supply rollers 28 between the screens 19—21. After being passed through the screens 19—21 in the exposure compartment the film is threaded over compression roller 29 and between both compression rollers 29 and 39. At the same time a strip of printing or other paper 41 is wound off of the idler spool 38 for cooperative passage with the film 22 between the compression rollers 29—39. Since compression roller 39 is connected with a crank 42 and since the roller 39 is geared to the roller 29, the compressive force between rollers 29 and 39 will tend to pull the film 22 and printing paper 41 off of their respective supply spools 28 and 38 when the crank is rotated in the direction shown in Fig. 1. Besides the function of pulling the film 22 and 41 off of the supply spools, the compressive force between rolls 29 and 39 serves to spread a developing liquid or paste across the face of the film and between the film 22 and the printing paper 41. Though the required developing paste or photographic processing fluid can be applied in several different ways, it is preferred that the film 22 be provided with spaced transverse fluid containers 43 adapted to releasably confine a photographic processing fluid. As the transverse fluid containers 43 move between the compression rollers 29—39, a fluid container or sack 43 will be broken so that the liquid contained therein will be spread along the face of the film as the film passes between rollers 29—39. Since the processing fluid is spread evenly over the face of the film, the film will be developed evenly and a print will be formed on the printing paper which accurately shows the details of images on the film negative as made by exposure of the film to X-rays directed downwardly through an object placed above the plate 18.

Since processing fluids and printing papers are presently available which will readily develop and print photographs in apparatus of the described type, photographic impressions of X-ray exposures may be received from the described apparatus in a relatively short period of time after exposure. With the described apparatus, it is possible to obtain prints of X-ray exposures within one minute after exposure. Since photographs of this nature are possible within such a short period of time, the apparatus disclosed may be used in surgery to a considerable advantage. If foreign materials are to be located within a person's body, an X-ray exposure may be made of that portion of the body and a photograph of the X-ray will be available within one minute after exposure. Because of the short developing and printing period, X-ray apparatus of the type described is accordingly useful immediately before and during operations as an aid to skillful and accurate surgical manipulations in relatively inaccessible and dangerous portions of a patient's body.

While a single form and embodiment of the present invention has been shown, it is readily apparent that the present invention is adaptable to various modifications and changes. All such modifications and changes as are within the scope of the hereunto appended claims are deemed to be a part of this invention.

What is claimed is:

1. Radiographic apparatus comprising a container formed of material that is impervious to actinic light, having at least one major opening therein, a plate of material transparent to X-rays and opaque to ordinary light for closing said opening, a partition within said container disposed in substantial parallelism with said plate dividing said container into separate exposure and developing compartments, lead sheeting on said partition for blocking the passage of X-rays into said developing compartment, a pair of sensitizing screens within said exposure compartment, means for introduction between said screens for separating said screens as necessary for the introduction of film therebetween, compression rollers between said exposure compartment and said developing compartment, a supply roll within said developing compartment providing a supply of printing paper, said compression rollers being effective to move exposed film from the exposure compartment into the developing compartment in contact with printing paper from said supply roll, and means carried by the film containing a developing fluid for introduction between said exposed film and printing paper to be spread therebetween by action of said compression rollers as necessary to effect printing of X-ray images on said printing paper.

2. Radiographic apparatus comprising a container sealed against the admission of stray light, a partition within said container dividing the interior thereof into upper and lower separate film exposure and film developing compartments, sensitizing screens within said exposure compartment, guide rails at the longitudinal edges of said screens, means movable into contact with said guide rails for separating the screens to permit film to be passed therebetween, a supply of photographic printing paper located in said developing compartment, means for supplying developing fluid to the film and paper, compression rollers for removing the exposed film from the exposure compartment into contact with the printing paper in the developing compartment, whereby to spread said developing fluid between said film and said printing paper, and means for moving said compression rollers.

3. Radiographic apparatus according to claim 2, wherein the means movable into contact with said guide rails for separating the sensitizing screens comprises a pair of handle-supported rollers manually movable into and out of contact with said guide rails.

4. Radiographic apparatus comprising a plural chambered cassette sealed against the admission of stray light, an X-ray impervious lead partition dividing said cassette into separate film exposure and film developing chambers, a pair of juxtaposed sensitizing screens within said exposure chamber arranged so that film may be passed therebetween, guide rails along the edges of said screens, means movable into contact with said rails for separating said screens to permit the passage of film therebetween, a supply of photographic printing paper located in said developing chamber, means inclusive of compression rollers for moving the exposed film away from sensitizing screens in the exposure chamber into the developing chamber in contact with said printing paper, means for supplying developing fluid to said film and paper, whereby passage of the film and printing paper through said compression rollers spreads said developing fluid therebetween, and means for moving said compression rollers.

5. Radiographic apparatus comprising a plural chambered cassette formed of material that is opaque to actinic light, means providing separate film exposure and film developing chambers, said exposure chamber having at least one major opening therein, a plate of material transparent to X-rays and opaque to ordinary light for closing said opening, sensitizing screens within said exposure chamber, guide rails along the edges of the screen, means movable into contact with said guide rails for separating the screens to permit film to be passed therebetween, means passing film between said screens and under said X-ray transparent surface for selective exposure to X-rays as desired, a supply of printing paper in said devolping chamber, means for supplying developing fluid to the film and paper, means inclusive of compression rollers for moving the X-ray exposed film from the exposure chamber into contact with the printing paper in the developing chamber, whereby to spread said developing fluid between said film and said printing paper, and means for moving said compression rollers.

6. Radiographic apparatus comprising a plural chambered cassette sealed against the admission of stray light, means providing separate film exposure and film developing chambers, a pair of juxtaposed film holding plates within said exposure chamber arranged so that film may be passed therebetween, at least one of said plates being a sensitizing screen, guide rails along the edges of said plates, means movable in contact with said guide rails for separating said plates to permit passage of film therebetween, means inclusive of compression rollers between said compartments for moving exposed film from said plates in said exposure chamber into said developing chamber, means for intimately contacting film with print paper and spreading developing fluid therebetween, and means for moving said compression rollers.

References Cited in the file of this patent

UNITED STATES PATENTS

| Number | Name | Date |
|---|---|---|
| 1,307,386 | Waite | June 24, 1919 |
| 1,563,362 | Herradora | Dec. 1, 1925 |
| 1,938,455 | Kelley | Dec. 5, 1933 |
| 2,026,000 | Powers | Dec. 31, 1935 |
| 2,381,556 | Powers | Aug. 7, 1945 |
| 2,435,718 | Land | Feb. 10, 1948 |
| 2,520,614 | Land | Aug. 29, 1950 |
| 2,572,357 | Land | Oct. 23, 1951 |

FOREIGN PATENTS

| Number | Country | Date |
|---|---|---|
| 502,014 | Great Britain | Mar. 7, 1939 |

OTHER REFERENCES

"Pictures in 60 Seconds," by H. Manchester, Scientific American, April 1947, pp. 167–170.